Feb. 26, 1935.　　　H. D. GEYER　　　1,992,528
FLEXIBLE RUBBER COUPLING

Filed Oct. 26, 1933

INVENTOR
Harvey D. Geyer
BY
Spencer Hardman & Fehr
HIS ATTORNEYS

Patented Feb. 26, 1935

1,992,528

UNITED STATES PATENT OFFICE 1,992,528

FLEXIBLE RUBBER COUPLING

Harvey D. Geyer, Dayton, Ohio, assignor, by mesne assignments, to General Motors Corporation, Detroit, Mich., a corporation of Delaware Application October 26, 1933, Serial No. 695,276

14 Claims. (Cl. 64—96)

This invention relates to flexible couplings for drivingly connecting two rotating shafts or other rotating members.

An object of this invention is to provide a simple, strong, efficient, and economically made universally flexible coupling which breaks the metallic path between the connected members and thereby greatly reduces or prevents the transmission of vibrations and sound.

Another object is to provide such a coupling having a relatively high torsional resilience which cushions and takes up the shock of suddenly applied or suddenly varied driving loads.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several view.

Figure 5:
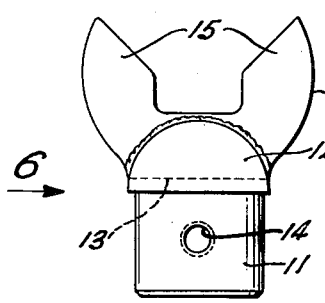
Fig. 5 is a face view of one of the metal yokes.
Figure 6:
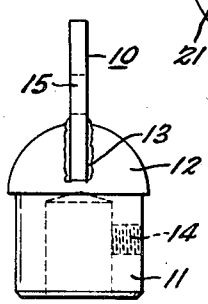
Fig. 6 is an edge view of the yoke looking in the direction of arrow 6 of Fig. 5.

In making the coupling of this invention two similar metal yokes 10 are first provided, each having a hub 11 adapted to be rigidly fixed to the shafts or other connected members. In the form shown, the hubs 11 are first made as separate metal parts having a spherical head 12 having a slot 13 therein. The yoke 10 is a flat piece of metal, preferably steel, blanked out to the form shown in Fig. 5 and inserted within the slot 13 and rigidly fixed therein by welding or brazing. Obviously if desired, the yoke 10 and its hub 11 could be made integral, in which case it could conveniently be a steel forging or a casting of brass, bronze, or other suitable metal. The hub 11 is drilled and threaded at 14 for a suitable set-screw by which it may be suitably fixed to its shaft.

Figure 1:
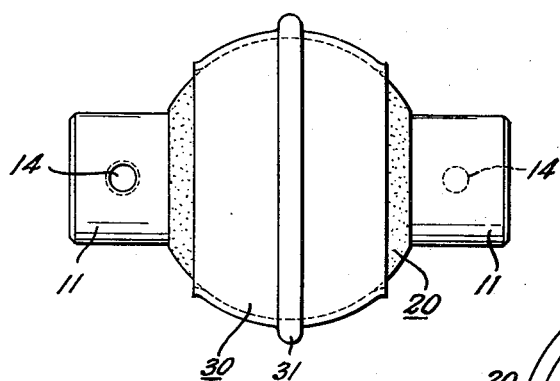
Fig 1 is a side elevation of the complete coupling.
Figure 2:
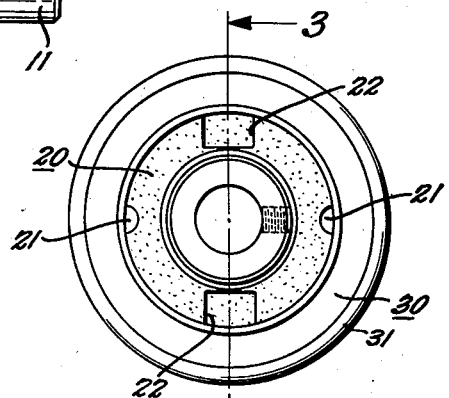
Fig. 2 is an end elevation of the complete coupling.
Figure 3:
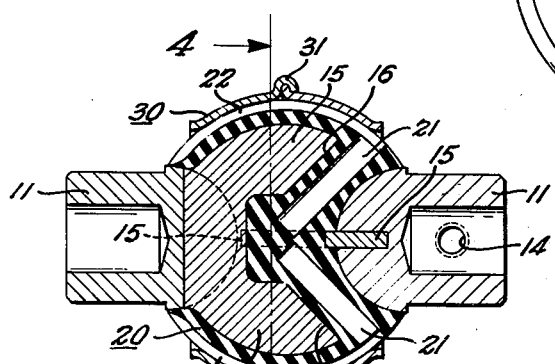
Fig. 3 is a longitudinal section taken on line 3—3 of Fig. 1.
Figure 4:
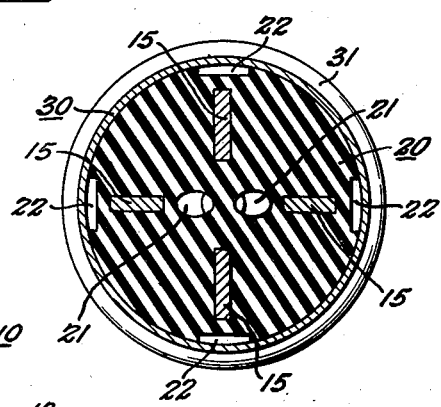
Fig. 4 is a transverse section taken on line 4—4 of Fig. 3.

The two yokes 10 are preferably first brass plated in order to provide a very strong bond between the metal and the rubber body to be vulcanized in situ thereupon. The two yokes 10 are then properly located as inserts in the cavity of a rubber vulcanizing mold by means of the outwardly projecting hubs 11, in such manner that the wings 15 mutually overlap and extend perpendicularly to one another, as shown in Figs. 3 and 4. The resilient rubber body 20 is then vulcanized in situ and thereby strongly surface bonded to the brass-plated yokes 10 and the spherical surfaces of the two hubs 11. Such vulcanization is done before the metal housing 30 is assembled upon the rubber body 20, which obviously greatly facilitates the insertion of the uncured rubber blanks and simplifies the molding operation in general since the vulcanizing die may be simply formed in two halves.

Preferably two angularly inclined holes 21 are molded in the rubber body 20 substantially in the plane of each of the two yokes 10 and adjacent the angularly inclined outer ends 16 of the wings 15, as clearly shown in Fig. 3, in order to greatly increase the flexibility of the coupling. These four holes 21 may be readily molded by four removable metal cores in a manner which will be obvious to those skilled in the art. In the form shown in the drawing, the metal housing 30 partially overlaps the holes 21, but since housing 30 is assembled upon the rubber body 20 only after it is completely molded the housing 30 will not interfere with the proper molding of the cored holes 21. Preferably four longitudinally extending shallow grooves 22 are also molded in the rubber body 20 in the two planes of the two yokes 10, as clearly shown in Figs. 3 and 4.

The metal housing 30 preferably comprises two stamped sheet metal halves which are inserted endwise over the completely molded rubber block 20 and held pressed snugly thereupon by a suitable lock seam 31. The purpose of housing 30 is to substantially enclose and protect the rubber body and to prevent outward bulging of the rubber between the wings 15 under the torsional load carried by the coupling. Housing 30 also positively limits the axial separation of the two yokes 10, that is when the coupling is put in tension, thus permitting the use of a softer and more resilient rubber for the body 20, with the result that greater deflection may be obtained without loss of strength.

Obviously the holes 21 and grooves 22 may be omitted if a less flexible coupling is desired. These holes 21 and grooves 22 provide unfilled spaces into which the resilient rubber will bulge and partially fill when the coupling is transmitting a load and thereby provide for a greater deflection and general cushioning effect. By locating the holes 21 and the grooves 22 substantially in the plane of the two yokes 10 it is obvious that the tilting of either of the yokes 10 in its plane relative to the housing 30 is materially facilitated. This readily permits the necessary relative movement of the yokes 10 when the connected shafts are out of alignment. All relative movement between the yokes 10 and housing 30 is taken by internal distortion in the resilient rubber body 20 and without any relative slipping of the rubber upon a metal surface. This greatly reduces wear and increases the life of the rubber body. Since the two yokes 10 are entirely isolated from each other by a substantial thickness of resilient rubber at all points the connected shafts are electrically insulated from each other and the coupling substantially prevents the transmission of vibrations and sound. This coupling is particularly suitable for drivingly connecting electric motors to various kinds of machines driven thereby. It is also suitable for connecting automobile generators, pumps, etc., to the shaft which drives them.

While the form of embodiment of the present invention as herein disclosed, constitutes a preferred form, it is to be understood that other forms might be adopted, all coming within the scope of the claims which follow.

What is claimed is as follows:

1. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially surrounding and maintaining same in metal isolated relationship during transmission of torque and axial thrust.

2. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially surrounding and isolating same against metal to metal contact, and a metal housing substantially enclosing the central portion of said rubber body but substantially isolated from said two hubs by said body.

3. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having holes molded therein adjacent the outer ends of said yokes whereby relative angular movement between the connected shafts is facilitated.

4. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having four angularly inclined holes molded therein and extending substantially parallel to and adjacent the outer ends of said two yokes and providing an unfilled space adjacent said outer edges.

5. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having shallow grooves molded in its surface adjacent the outer longitudinal edges of said embedded metal yokes, whereby relative angular movement between said yokes is facilitated.

6. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having four substantially axially extending shallow grooves molded in its surface substantially in the planes of said two yokes.

7. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having holes molded therein adjacent the outer ends of said yokes, and a metal housing substantially encasing the central portion of said rubber body but isolated from said two hubs by said body.

8. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having four angularly inclined holes molded therein and extending substantially parallel to and adjacent the outer ends of said two yokes and providing an unfilled space adjacent said outer edges, and a metal housing substantially encasing the central portion of said rubber body but in spaced relation to said two hubs.

9. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having shallow grooves molded in its surface adjacent the outer longitudinal edges of said embedded metal yokes, whereby relative angular movement between said yokes is facilitated, and a metal housing snugly enclosing the central portion of said rubber body and isolated by said body.

10. A flexible coupling for rotating shafts, comprising: two opposed metal hubs adapted to be fixed to the respective ends of two connected shafts, said hubs each having an inwardly projecting metal yoke rigid therewith, said two yokes having their planes substantially perpendicular to each other and mutually overlapping but spaced from each other, and a molded body of resilient rubber bonded by vulcanization in situ to said two yokes and substantially enclosing same, said rubber body having four axially extending shallow grooves molded in its surface substantially in the planes of said two yokes, and a metal housing substantially enclosing the central portion of said rubber body and isolated by said body.

11. A metal-isolating flexible coupling for drivingly connecting two rotating members, comprising: two opposed substantially flat metal yokes having their planes substantially perpendicular to each other and mutually overlapping but having their central portions cut away so as to clear one another and provide an intervening space in an axial direction therebetween, and a unitary body of resilient rubber embedding said two yokes and bonded by vulcanization in situ thereto and lying partly within said intervening space.

12. A metal-isolating flexible coupling for drivingly connecting two rotating members, comprising: two opposed substantially flat metal yokes having their planes substantially perpendicular to each other and mutually overlapping but having their central portions cut away so as to clear one another and provide an intervening space in an axial direction therebetween, and a unitary body of resilient rubber embedding said two yokes and bonded by vulcanization in situ thereto and lying partly within said intervening space, and a metal housing snugly encasing the central portion of said rubber body and isolated from said yokes by said body.

13. A metal-isolating flexible coupling for drivingly connecting two rotating members, comprising: two opposed substantially flat metal yokes having their planes substantially perpendicular to each other and mutually overlapping but having their central portions cut away so as to clear one another, and a unitary substantially spherical resilient rubber body embedding said two yokes and bonded thereto by vulcanization in situ and forming a rounded integral structure.

14. A metal-isolating flexible coupling for drivingly connecting two rotating members, comprising: two opposed substantially flat metal yokes having their planes substantially perpendicular to each other and mutually overlapping but having their central portions cut away so as to clear one another, and a unitary substantially spherical resilient rubber body embedding said two yokes and bonded thereto by vulcanization in situ, said rubber body having four angularly inclined unfilled holes molded therein and extending substantially parallel to and adjacent the outer ends of said two yokes, whereby relative angular movement between said yokes is facilitated.

HARVEY D. GEYER.